US005475384A

United States Patent [19]

Manenti et al.

[11] Patent Number: 5,475,384

[45] Date of Patent: Dec. 12, 1995

[54] REMOTE ADDRESSABLE TRANSDUCER PROVIDED WITH AUTOMATIC CALIBRATION AND DIGITAL COMPENSATION

[75] Inventors: Luciano Manenti, Brescia; Marco Lionetti, Milan, both of Italy

[73] Assignee: Nicotra Sistemi S.p.A., Milan, Italy

[21] Appl. No.: 80,817

[22] Filed: Jun. 24, 1993

[30] Foreign Application Priority Data

Jun. 26, 1992 [IT] Italy ................................ MI92A1575

[51] Int. Cl.[6] .................................................... G08C 25/00

[52] U.S. Cl. .................... 340/870.04; 340/501; 340/505; 340/825.54; 340/870.21

[58] Field of Search .................................... 340/505, 501, 340/511, 517, 825.52, 825.54, 870.04, 870.17, 870.21, 518, 310 R

[56] References Cited

U.S. PATENT DOCUMENTS

| | | | |
|---|---|---|---|
| 4,546,344 | 10/1985 | Guscott et al. | 340/501 |
| 4,575,806 | 3/1986 | Aldrich et al. | 340/501 |
| 4,642,636 | 2/1987 | Smith et al. | 340/870.17 |
| 4,785,284 | 11/1988 | Kimura | 340/505 |
| 4,816,808 | 3/1989 | Morita | 340/518 |
| 5,200,743 | 4/1993 | St. Martin et al. | 340/310 R |

*Primary Examiner*—John K. Peng
*Assistant Examiner*—Daniel J. Wu
*Attorney, Agent, or Firm*—Wenderoth, Lind & Ponack

[57] ABSTRACT

The RAD transducer comprises a sensor (1) for measuring physical quantities, a power supply section (7), a clock section (2), a timing section (4,5) and a circuitry for the acquisition of a measurement and its frequency conversion for transmission. This acquisition circuitry includes a microcontroller (11), a memory (14) containing compensation parameters used in a calibrating process an analogue/digital converter (13) for converting analogue measurement delivered by the main sensor (1) in a digital form adapted to be processed by the microcontroller (11), a temperature sensor (15) converting a temperature value into a voltage value, an analogue/digital converter (16) for converting the analogue measurement given by the temperature sensor (15) into a digital form adapted to be processed by the microcontroller (11), and frequency generating meads (17) for generating the signal to be transmitted on the line through the power supply section.

3 Claims, 1 Drawing Sheet

REMOTE ADDRESSABLE TRANSDUCER PROVIDED WITH AUTOMATIC CALIBRATION AND DIGITAL COMPENSATION

BACKGROUND OF THE INVENTION

1. Field of the Invention

This invention generally relates to remote control systems, more particularly to the field of the remote addressable devices and, more particularly, to a transducer of this type having automatic calibration and digital compensation functions.

2. Description of the Related Art

Remote control systems particularly designed for the acquisition of a plural measurements in a widespread geographic area have been known for sometime. These systems generally comprise a data acquisition center unit provided with a computer and a plurality of remote addressable transducers, also already known and supplying the measured values to the center unit under control thereof in a sequence predetermined by a different address code assigned to each transducer.

These remote addressable transducers, referred to later for the sake of brevity as RAD transducers (remote addressable devices), comprise a sensor for the quantity to be measured, a measure acquisition and conversion circuitry, a clock generating circuit, an addressing/timing device for determining the time of energization of the transducer according to the associated address, a power supply for supplying the energization voltage to the above components, as well as a line for supplying a signal proportional to the quantity to be measured by the sensors. This signal is generally a frequency.

These RAD transducers exhibit the following features:

1) possibility of being connected in a plurality (up to 127) to the acquisition unit through a single pair of wires to which they are parallel connected;

2) possibility of being power supplied and of transmitting the measures thereby detected to the acquisition unit through this single pair of wires;

3) possibility of being connected in a distance up to ten kilometers by the acquisition unit if a standard telephonic loop is used as the single pair of wires;

4) possibility of being marked, when parallel connected to a line, through an address (number 1 to 127) set thereon in a binary configuration of bridges;

5) possibility of replying in a sequence determined by their address in intervals of two seconds from each other from the time in which the line is power supplied, the reply comprising a modulation of the adsorbed current carried out with a frequency proportional to the value of the measured quantity.

The RAD transducers designed to meet these requirements must have a very reduced current consumption. As a matter of fact, they have to be power supplied by lines having a length of several kilometers and therefore a resistance value of some Kohms. To avoid excessive voltage drops along the line, the consumption is to be limited to few milliamperes. Furthermore, they must be ready to transmit a stable measurement in a very reduced time from the energization. In fact, the RAD transducers connected to a line normally remain in a wait condition with very reduced consumption (few microampere). One of the transducers is activated every two seconds following a sequence determined by the addressing and remains active for a second and half. To permit a correct acquisition of the measurement, the signals transmitted by the RAD transducer must be already stable a few hundred milliseconds after the energization.

The typical requirements of this type of RAD transducer for telephonic applications require overall dimensions to be reduced in order to be housed in a joint of a telephonic cable and a very low cost. The RAD transducers of this type are produced using a conventional analogic circuitry, partially in the form of hybrid circuits and partially in the form of surface mounted circuit, with functional calibrations carried out on the resistances of the hybrid circuit by means of a laser. The reduced dimensions of the device make very difficult the assembly of calibrating potentiometers which, inter alia, would reduce the reliability thereof.

The manufacturing process of a conventional RAD transducer comprises the following steps:

a) component procurement, b) assembly of the RAD transducer or the portions thereof, c) detection of the operating parameters before the calibration in a climatic chamber, d) calibration of the circuit according to the detected data and possible assembly of the portions, and e) final test in a climatic chamber.

This calibrating procedure is rather difficult because the RAD transducer is to be placed twice in a climatic chamber, all the circuitry and the necessary mechanical operations are to be twice repeated and each single RAD transducer is to be calibrated by hand according to the data obtained during the step c).

The present invention aims at obviating these and other drawbacks which will be apparent in the following description.

SUMMARY OF THE INVENTION

Therefore, it is the main object of the present invention to provide a RAD transducer of a new design which permits it to be automatically calibrated, thereby eliminating the functional calibrations carried out by hand.

It is another object of the present invention to provide the complete RAD transducer in a single surface mounted printed circuit. It is still another object of the present invention to provide a RAD transducer which permits a very good compensation of the deficencies of the sensor features and the analogue circuitry.

More particularly, the RAD transducer according to the present invention is of the type comprising a sensor for the quantities to be measured, a clock generating circuit, an addressing/timing device for determining the energization time according to an associated address, a power supply for supplying an energization voltage to the above components, a circuitry of acquisition of the measurements and frequency conversion thereof for transmission and a line for supplying this frequency signal and is characterized in that said acquisition circuitry comprises:

a microcontrollor, memory means connected to the microcontroller for memorizing the compensation parameters during the calibration an analogue/digital converter connected between the sensor of the quantity to be measured and the microcontroller for converting the analogue measure output of the sensor to a digital value adapted to be processed by the microcontroller, a temperature sensor which converts the temperature value to a voltage value, an analogue/digital converter which converts the analogue temperature measure output of the sensor to a digital value adapted to be processed by the microcontroller, and frequency generating means for generating the signal to be transmitted on the line through the power supply circuit.

According to a feature of the invention, the acquisition circuitry comprises also a serial interface for communicating with the processor and handling the calibration process.

According to another feature of the present invention the memory means comprise a memory ROM for the program, a memory RAM for the operating parameters, and a non-volatile memory EEPROM for the calibration parameters.

According to still another feature of the present invention, between the sensor of the quantities to be measured and the associated analogue/digital converter an amplifier is arranged for amplifying the voltage up to a level compatible with the input of the analogue/digital converter.

BRIEF DESCRIPTION OF THE DRAWING

This invention will be described in more detail in connection with a preferred embodiment thereof, given only by way of example and therefore not intended in a limiting sense, illustrated in the accompanying drawing, wherein.

DESCRIPTION OF THE PREFERRED EMBODIMENT

Figure 1:
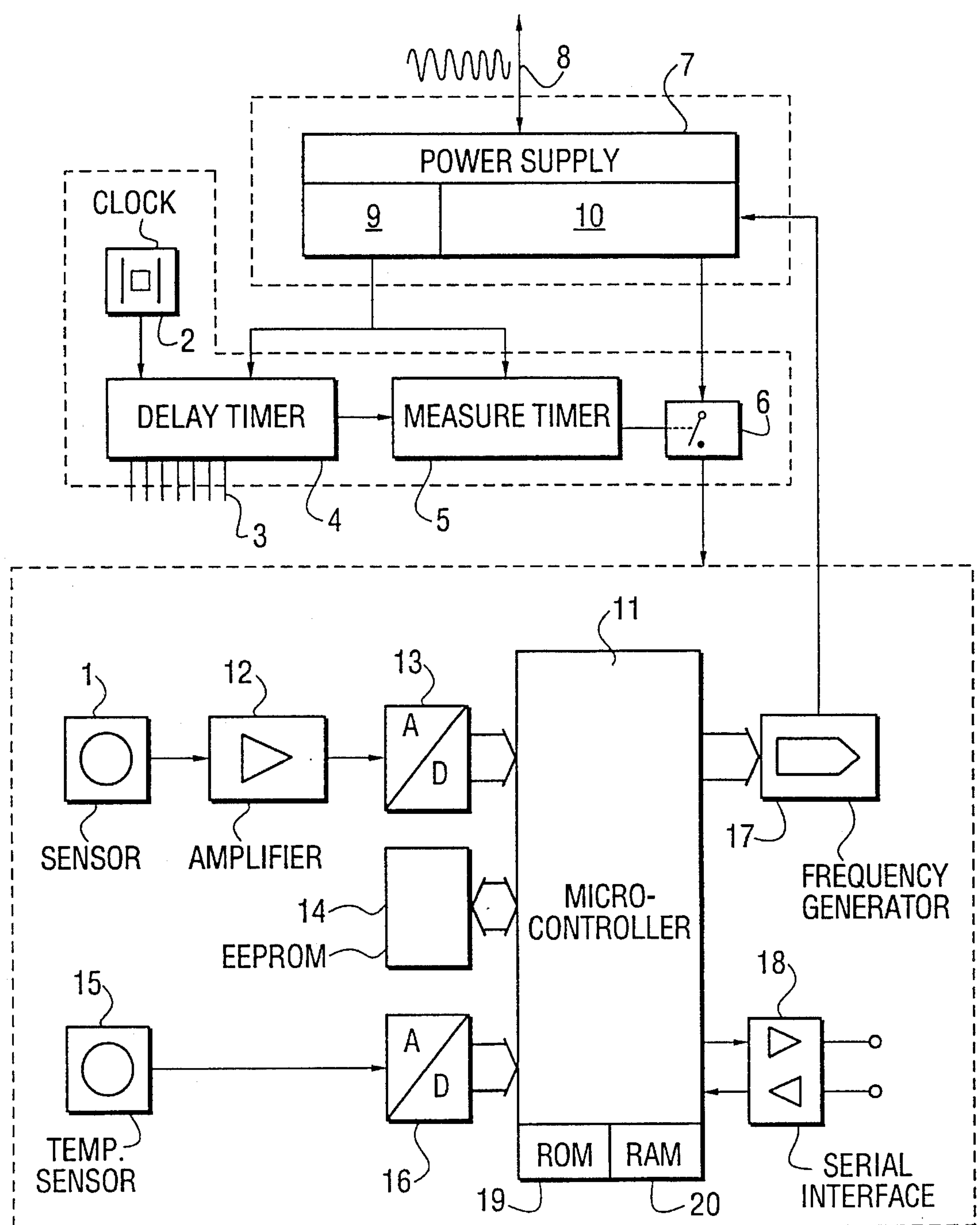
FIG. 1 shows a block diagram of the RAD transducer provided with the automatic calibrating circuit and the digital compensation functions according to the present invention.

In a conventional RAD transducer and therefore of known type, there is a circuitry of acquisition of the measurement and the frequency conversion thereof for the transmission. This circuitry substantially comprises an amplifier of the voltage generated by the sensor and a voltage/frequency converter.

As can be seen from this FIG. 1 and as already specified at the beginning, the RAD transducer according to the present invention and illustrated in the block diagram, includes a sensor 1 for the quantity to be measured, a clock generating circuit 2, an addressing device 3 for assigning a specific address to the transducer associated to a programmable-delay timer 4 which supplies its signal to a measure timer 5 for determining the energization time through a switch 6 according to the address assigned to the transducer. Furthermore, there is a power supply 7 for supplying the energization voltage to the above mentioned components, a line 8 for supplying the frequency signal delivered by the transducer. The power supply has a section 9 for power supplying the programmable-delay timer 4 and the measure timer 5 and a section 10 for power supplying through the switch 6 the components of the circuitry for the acquisition of the measure and its frequency conversion.

The so described transducer is of a conventional and known type, however the addressing portion described can be designed also in another manner.

According to the present invention, the circuitry for the acquisition of the measure and the frequency conversion thereof includes a microcontroller 11 which receives the measure signal in a digital form, i.e. in a form adapted to be processed thereby. To this purpose, the analogue signal (voltage) supplied by the sensor 1 is amplified in an amplifier 12 and then converted in a digital form through an analogue/digital converter 13 connected to the microcontroller 11.

Connected to the microcontroller 11 is a non-volatile memory 14 preferably comprising a memory EEPROM, in which, during the calibration of the RAD transducer, the compensation parameters are memorized which are then used during the normal operation of the RAD transducer for calculating the corrections to be made to the measure given by the sensor 1.

For carrying out also a temperature compensation of the RAD transducer, a temperature sensor 15 is provided, which supplies its voltage signal, and therefore an analogue signal, to an analogue/digital converter 16 which supplies the sensor signal in a digital form to the microcontroller 11 so as it can be processed thereby.

The microcontroller 11 processes the signals according to a specific program and controls a frequency generator 17 generating the frequency signal to be transmitted on the line 8 of the power supply 7.

The above circuitry finally includes also a serial interface 18 connected to the microcontroller 11 and intended to be used during the calibration for communicating with the computer handling all the process.

For carrying out the automatic calibration of the RAD transducers according to the present invention, they are directly introduced in the climatic chamber controlled by the automatic calibration and testing system handled by the calibration processor from which they will be removed at the end of the automatic cycle in a condition already tested and ready for sale. In this manner the above described steps c), d) and e) of the calibration of a RAD transducer of conventional type are made automatic. To this purpose, the microcontroller 11 comprises a microprocessor provided with memory ROM 19 of program and memory RAM 20 for data, which is programmed so as to handle all the operations of the transducer, from the acquisition of the main measure and the temperature to the compensation thereof up to the generation of the output frequency. Therefore, during the calibration it provides for the conversation with the computer handling the calibration step. Preferably, this microcontroller is formed of the integrated circuit MC 68HCO5B6 sold by MOTOROLA and provided with a personal program developed by and owning to the Applicant and capable of handling the calibration and compensation functions.

OPERATION

As already said, the power supply 7 supplies the energy necessary for energizing all the components of the transducer, to this purpose the section 9 provides for power supplying the programmable-delay timer 3 and the measure timer 5 which are controlled by the clock signals supplied by the clock generator 2. On the contrary, the section 10 provides for power supplying the switch 6 and the components included in the above described aquisition circuitry.

Sensor 1 of the quantity to be measured power supplied by the section 10 of the power supply 7 converts the quantity to be measured in a voltage proportional thereto and send it to the amplifier 12 which amplifies the voltage generated by the sensor up to a level which is compatible with the input of the analogue/digital converter 13. The latter converts the analogue signal in a digital signal adapted to be processed by the microcontroller 11.

Simultaneously, the temperature sensor 15, also power supplied by the section 10 of the power supply 7, converts the temperature value in a voltage value. This voltage value is supplied to the analogue/digital converter 16 which converts the analogue value of temperature in a digital value adapted to be processed by the microcontroller 11.

During the calibration, i.e. when the RAD transducer is introduced in the climatic chamber, the microcontroller 11 provides for the conversation according its own personal program and through the serial interface 18 with the computer handling the automatic calibration and for the memorization in a memory EEPROM 14 of the compensation parameters which are then used, during the normal operation of the transducer, for calculating the corrections to be made to the measure acquired by the sensor 1 during the normal operation, before they are supplied to the frequency generator 17 which will deliver, through the power supply 7, the frequency signal output of the transducer to be transmitted to the acquisition central unit on the line 8. By means of the automatical calibration and digital compensation functions according to the present invention, the following advantages ared obtained:

- elimination of the functional calibrations by means of laser, which are very complex and expensive operations and require for their realization sofisticated equipment normally used by the hybrid circuit manufacturers;
- possibility of producing all the transducer on a single surface mounted printed circuit, because it is no longer necessary the use of hybrid circuits with the result that the transducer can be assembled in a single step and is more rugged and inexpensive;
- possibility of obtaining a very good compensation of the deficencies in the features of the sensors and the analogue circuitry because the calibrations which are easily carried out in a conventional analogue circuit are corrections of deviation and gain which do not allow possible non-linearity errors of the circuit or the sensor to be compensated;
- possibility of integrating in a single automatic step the calibration operation and the final testing of the transducer removed from the calibration and test process in a condition ready for sale.

In addition to these advantages, also other advantages are obtained which can be related to the single components to be used and to the performances of the transducer, The advantages relating to the single components are the following:

- thanks to the digital compensation it is not necessary for the sensor of the quantity to be measured to be particularly accurate, but it is sufficient that the correspondence between the quantity to be measured and the voltage generated is repeatable;
- the employed amplifier does .not require deviation or gain calibrations because possible deviations from ideal values are compensated for during the calibration;
- the analogue/digital converters must have a high resolution, however a high linearity is not required because possible deviations, provided that they are repeatable, are compensated during the calibration.

The advantages relating to the performances of the transducer are the following:

- low consumption, compatible with the need to be remotely power supplied;
- good reply velocity;
- all the measuring and linearization steps are carried out in a time between 100 and 300 m/sec, compatible with the reply times of the RAD transducers;
- generation of a sinusoidal frequency with low distortion thanks to the techniques of digital synthesis, what can be obtained with difficulty by means of an analogue circuitry of a conventional type;
- possibility of transmitting, as a secondary information, also the temperature measurement without additional costs;
- very good total precision also using low cost components;
- compatibility with the techniques of numerical transmission of the measure;
- linearization directly on the RAD transducer of non-linear measures.

We claim:

1. Automatic calibrating and digitally compensated remote addressable transducer comprising:

a measuring and frequency conversion circuit including a physical quantity sensor for detecting a physical quantity to be measured and a frequency generator for outputting a frequency signal having a frequency which is indicative of a level of the physical quantity detected by said physical quantity sensor;

an addressing circuit for assigning a specific address to the transducer;

a timing circuit for determining an energizing time of said measuring and frequency conversion circuit;

a clock generator connected to said addressing circuit;

a power supply for supplying an energizing voltage to said addressing circuit, said timing circuit and said measuring and frequency conversion circuit;

a single line for supply the frequency signal output by said frequency generator; and a switch, coupled between said power supply and said measuring and frequency conversion circuit, for switching said measuring and frequency conversion circuit on and off;

wherein said measuring and frequency conversion circuit further includes (a) a microcontroller, (b) a temperature sensor for sensing temperature and supplying a voltage which is indicative of a value of the temperature sensed by said temperature sensor, (c) memory means connected to said microcontroller for storing compensation parameters used during a calibration process carried out by said microcontroller, and (d) A/D converters connecting said temperature sensor and said physical quantity sensor to said microcontroller;

wherein said microcontroller is programmed to receive the compensation parameters of the transducer and to store the compensation parameters in said memory means, and wherein said microcontroller is further programmed to use said compensation parameters stored in said memory means and the temperature sensed by said temperature sensor during the operation of transducer for calculating corrections to be made to a measurement obtained by the physical quantity sensor before said measurement is supplied to said frequency generator.

2. A transducer according to claim 1, wherein said measuring and frequency conversion circuit includes a serial interface for communicating with said microcontroller and handling the calibration process.

3. A transducer according to claim 1, wherein said memory means includes a non volatile electrically erasable programmable read-only memory.

* * * * *